(12) United States Patent
Zhang

(10) Patent No.: US 11,047,329 B2
(45) Date of Patent: Jun. 29, 2021

(54) METHOD AND DEVICE FOR DIAGNOSING A CRANKCASE VENTILATION LINE FOR AN INTERNAL COMBUSTION ENGINE

(71) Applicant: Vitesco Technologies GmbH, Hannover (DE)

(72) Inventor: Hong Zhang, Munich (DE)

(73) Assignee: VITESCO TECHNOLOGIES GMBH, Hanover (DE)

(*) Notice: Subject to any disclaimer, the term of this patent is extended or adjusted under 35 U.S.C. 154(b) by 0 days.

(21) Appl. No.: 16/763,264

(22) PCT Filed: Oct. 29, 2018

(86) PCT No.: PCT/EP2018/079536
§ 371 (c)(1),
(2) Date: May 12, 2020

(87) PCT Pub. No.: WO2019/096568
PCT Pub. Date: May 23, 2019

(65) Prior Publication Data
US 2020/0291884 A1 Sep. 17, 2020

(30) Foreign Application Priority Data
Nov. 14, 2017 (DE) .................. 10 2017 220 190.8

(51) Int. Cl.
*F02D 41/22* (2006.01)
*F01M 13/00* (2006.01)
(Continued)

(52) U.S. Cl.
CPC ......... *F02D 41/22* (2013.01); *F01M 13/0011* (2013.01); *F01M 13/022* (2013.01);
(Continued)

(58) Field of Classification Search
CPC .... F02D 41/22; F02D 41/1439; F02D 41/146; F02D 41/0007; F02D 2200/02;
(Continued)

(56) References Cited

U.S. PATENT DOCUMENTS 7,826,987 B2   11/2010   Aikawa ........................... 702/50
8,342,012 B2   1/2013    Jach ............................. 73/114.32
(Continued)

FOREIGN PATENT DOCUMENTS

DE   10 2009 059 662   6/2011   ............ G01M 15/04
DE   10 2013 223 656   5/2014   ............ F02D 41/22
(Continued)

OTHER PUBLICATIONS

DE 10 2013 223 656 U.S. Pat. No. 9,303,592.
(Continued)

*Primary Examiner* — Grant Moubry
(74) *Attorney, Agent, or Firm* — Slayden Grubert Beard PLLC

(57) ABSTRACT

Various embodiments include a method for diagnosing a crankcase ventilation line of a crankcase ventilation device for an internal combustion engine having a crankcase, an intake tract, and a compressor arranged in the intake tract for compressing the intake air comprising: diverting fresh air from the intake tract via a fresh air supply line; either enabling or inhibiting a flow of fresh air into a free volume of the crankcase depending on a switch position of a shut-off valve in the fresh air supply line; detecting a nitrogen oxide concentration in the crankcase during the process of crankcase ventilation, close to the point of introduction into the intake tract upstream of the compressor using a nitrogen oxide sensor; and evaluating the tightness of the crankcase ventilation line based at least in part on the detected nitrogen oxide concentration.

7 Claims, 1 Drawing Sheet

(51) Int. Cl.
*F01M 13/02* (2006.01)
*F02M 25/06* (2016.01)
*F02M 35/10* (2006.01)

(52) U.S. Cl.
CPC ...... *F02M 25/06* (2013.01); *F02M 35/10157* (2013.01); *F01M 2013/027* (2013.01); *F02D 2041/228* (2013.01); *F02D 2200/02* (2013.01); *F02D 2250/08* (2013.01)

(58) Field of Classification Search
CPC .......... F02D 2250/08; F02D 2041/228; F01M 11/10; F01M 13/00; F01M 13/0011; F01M 13/022; F01M 13/04; F01M 2013/027; F02M 25/06; F02M 35/10157; F02M 35/10209; F02M 35/10222
See application file for complete search history.

(56) References Cited

U.S. PATENT DOCUMENTS

| | | | | |
|---|---|---|---|---|
| 8,469,010 | B2* | 6/2013 | Inoue | F02D 41/1454 123/698 |
| 8,887,559 | B2 | 11/2014 | Kuhn | 73/114.33 |
| 9,303,592 | B2 | 4/2016 | Pursifull | |
| 9,664,079 | B2 | 5/2017 | Jentz | |
| 10,760,516 | B2* | 9/2020 | Takahashi | F02D 41/22 |
| 2008/0027661 | A1* | 1/2008 | Aikawa | F01M 11/10 702/50 |
| 2011/0282539 | A1* | 11/2011 | Inoue | F02D 41/146 701/31.4 |
| 2014/0081549 | A1 | 3/2014 | Rollinger | 701/101 |
| 2017/0268448 | A1 | 9/2017 | Takahashi | F02D 41/22 |
| 2019/0226368 | A1* | 7/2019 | Hofmann | F01M 13/00 |

FOREIGN PATENT DOCUMENTS

| | | | |
|---|---|---|---|
| DE | 10 2013 224 030 | 5/2015 | ............. F02D 41/22 |
| DE | 10 2015 116 483 | 4/2016 | ............. F01M 13/02 |
| DE | 10 2016 206 991 | 10/2017 | ........... G01N 27/417 |
| EP | 1 900 911 | 3/2008 | ............. F01M 11/10 |
| EP | 2 530 262 | 12/2012 | ............. F01M 13/00 |
| JP | 2006-138242 | 6/2006 | ............. F01M 13/00 |
| WO | 2012-034917 | 3/2012 | ............... B30B 9/12 |

OTHER PUBLICATIONS

DE 10 2015 116 483 U.S. Pat No. 9,664,079.
DE 10 2009 059 662 U.S. Pat. No. 8,342,012.
EP 1 900 911 U.S. Pat. No. 7,826,987.
EP 2 530 262 U.S. Pat. No. 8,469,010.
WO 2012-034917 U.S. Pat. No. 8,887,559.
Search Report for International Application No. PCT/EP2018/079536, 30 pages, dated Jan. 21, 2019.
Office Action for German Patent Application No. 10 2017 220 190.8, 6 pages, dated Oct. 12, 2018.

* cited by examiner

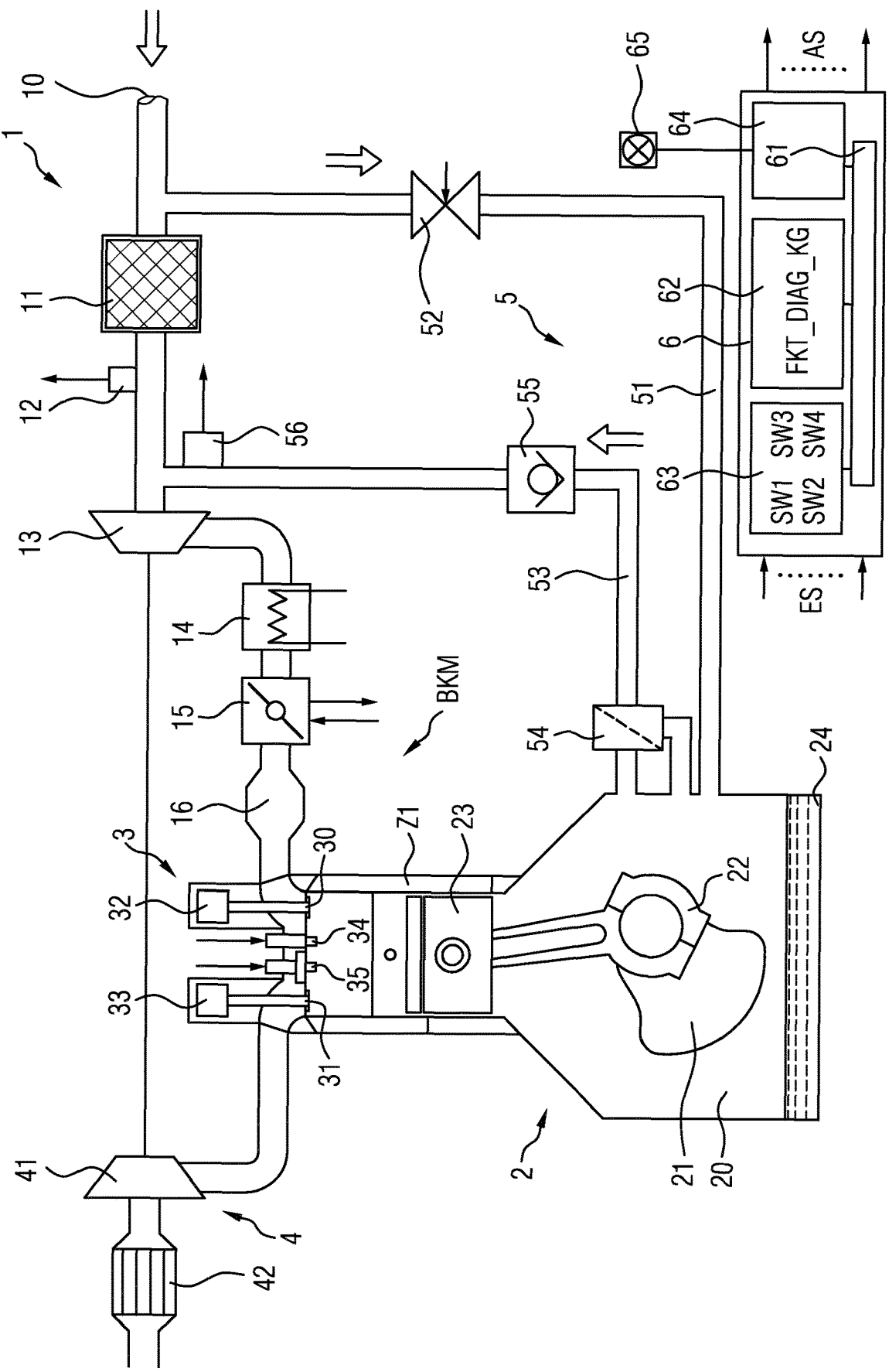

METHOD AND DEVICE FOR DIAGNOSING A CRANKCASE VENTILATION LINE FOR AN INTERNAL COMBUSTION ENGINE

CROSS-REFERENCE TO RELATED APPLICATIONS

This application is a U.S. National Stage Application of International Application No. PCT/EP2018/079536 filed Oct. 29, 2018, which designates the United States of America, and claims priority to DE Application No. 10 2017 220 190.8 filed Nov. 14, 2017, the contents of which are hereby incorporated by reference in their entirety.

TECHNICAL FIELD

The present disclosure is related to internal combustion engines. Various embodiments include methods and/or devices for diagnosing a crankcase ventilation line for an internal combustion engine.

BACKGROUND

Immediately after a cold start of an internal combustion engine, unburned fuel can dissolve in the lubricant of the internal combustion engine and is then evaporated again as the operating temperature rises. For example, in a petrol- or diesel-fired, reciprocating piston internal combustion engine, in the first few seconds following cold start, fuel can condense on the oil film on the cold wall of the combustion chamber and dissolve in the oil film. This problem occurs above all with direct injection of fuel into the combustion chamber, and in particular in petrol engines, but also with other methods of fuel supply and other internal combustion engines.

The dissolution of fuel and lubricant causes an undesirable change in the lubrication properties of the lubricant. This can increase wear and the probability of a fault, and the expected service life of the internal combustion engine may be reduced. The fuel dissolved in the lubricant evaporates again as the operating temperature rises, and collects in the crankcase of a reciprocating piston internal combustion engine. Since the crankcase forms a closed chamber, the pressure would constantly rise without ventilation.

Therefore, the crankcase is connected to the intake tract via a crankcase ventilation line. Because of a pressure fall from the crankcase to the intake tract, a mass flow is created from the crankcase to the intake tract, depending on the operating state of the internal combustion engine. This mass flow contains by-products of complete and incomplete combustion (exhaust gas or inert gas), which pass from the combustion chamber over sealing rings of the piston and enter the crankcase as blow-by gas. The mass flow furthermore contains air which flows via a ventilation line into the crankcase and sometimes contains soot, lubricating oil in the form of very small droplets, and hydrocarbons (fuel) which evaporate from the lubricant in the crankcase. As well as the pressure fall in the crankcase, this also ensures that no unburned fuel enters the environment.

Since fuel vapours can enter the environment in the case of leakage of components of the crankcase ventilation system, in some countries, legislation—in particular CARB in the USA—specifies that the crankcase ventilation system must be monitored on-board with regard to its tightness. In particular, it must be detected whether the crankcase ventilation line has become detached or contains a leak, the diameter of which is equal to or greater than the smallest diameter of the crankcase ventilation line.

DE 10 2009 059 662 A1 describes a method for diagnosis of line systems, in particular for crankcase ventilation of internal combustion engines, in which a corrective value for an operating parameter of the internal combustion engine is formed in each of at least two temporally successive determination steps. The corrective values or values derived therefrom are used as evidence of a defect in the line system. The determination steps may here each be performed in an idle phase of the internal combustion engine.

WO 2012/034907 A1 describes a method for testing the function of a ventilation device for crankcase ventilation of an internal combustion engine, wherein the crankcase is connected to an air supply system of the internal combustion engine via the ventilation device. The method comprises the following steps:

determining the pressure difference between ambient pressure and a crankcase pressure in the crankcase; and establishing a fault in the ventilation device depending on the pressure difference if a release condition is fulfilled; wherein the release condition is fulfilled if an amount of an air mass flow filtered through a low-pass filter in the air supply system exceeds a first threshold value.

SUMMARY

The teachings of the present disclosure include methods and devices with which, in a simple and economic fashion, the function suitability of a crankcase ventilation line of an internal combustion engine can be checked. For example, some embodiments include a method for diagnosing a crankcase ventilation line (53) of a crankcase ventilation device (5) for an internal combustion engine (BKM) having a crankcase (20) and an intake tract (1) and a compressor (13) arranged in the intake tract (1) for compressing the intake air, wherein fresh air is diverted from the intake tract (1) via a fresh air supply line (51); depending on a switch position of a shut-off valve (52) in the fresh air supply line (51), a flow of fresh air into a free volume of the crankcase (20) is enabled or inhibited; the free volume of the crankcase (20) is connected to the intake tract (1) upstream of the compressor (11) by means of the crankcase ventilation line (53); during the process of crankcase ventilation, the nitrogen oxide concentration in the crankcase ventilation line (53) close to the point of introduction into the intake tract (1) upstream of the compressor (13) is detected by means of a nitrogen oxide sensor (56); and the tightness of the crankcase ventilation line (53) is evaluated depending on the detected nitrogen oxide concentration.

In some embodiments, the detected nitrogen oxide concentration is compared with a first predefined threshold value (SW1), and if this threshold value (SW1) is exceeded, a tight crankcase ventilation line (53) is detected.

In some embodiments, the detected nitrogen oxide concentration is compared with a second threshold value (SW2) which is lower than the first threshold value (SW1), and if this threshold value (SW2) is not reached, a leak in the crankcase ventilation line (53) is concluded.

In some embodiments, the detected nitrogen oxide concentration is compared with a third threshold value (SW3) which is lower than the second threshold value (SW2), and if this threshold value (SW3) is not reached, it is concluded that the crankcase ventilation line (53) has been removed or become detached.

In some embodiments, the threshold value (SW2) is established depending on the size of the leak to be detected.

In some embodiments, if the threshold values (SW2, SW3) are not reached, a corresponding fault entry is made in a fault memory (64) of a control device (6), and/or a fault display apparatus (65) for the driver of the vehicle powered by the internal combustion engine (BKM) is activated.

As another example, some embodiments include a device for diagnosing a crankcase ventilation line (53) of a crankcase ventilation device (5) for an internal combustion engine (BKM) having a crankcase (20) and an intake tract (1) and a compressor (13) arranged in the intake tract (1) for compressing the intake air, with a fresh air supply line (51) which branches off the intake tract (1) and leads to the crankcase (20), a shut-off valve (52) arranged in the fresh air supply line (51) which, depending on its switch position, enables or inhibits a flow of fresh air into a free volume of the crankcase (20), a crankcase ventilation line (53) which connects the free volume of the crankcase (20) to the intake tract (1) upstream of the compressor (11), a nitrogen oxide sensor (56) arranged in the crankcase ventilation line (53) at a location close to the point of introduction into the intake tract (1) upstream of the compressor (13), for detecting the nitrogen oxide concentration in the crankcase ventilation line (53), and a control device (6) which is configured to perform a method as described above.

BRIEF DESCRIPTION OF THE DRAWINGS

An exemplary embodiment of the teachings herein will be explained in more detail below by means of the schematic drawing. The only FIGURE shows diagrammatically a charged internal combustion engine with a crankcase ventilation device and assigned control device. In the interests of clarity, only those components are depicted that are necessary for an understanding of the teachings herein. In particular, only one cylinder of the internal combustion engine is shown.

DETAILED DESCRIPTION

The present disclosure teaches methods and/or devices for diagnosing a crankcase ventilation line of a crankcase ventilation device for an internal combustion engine having a crankcase and an intake tract and a compressor arranged in the intake tract for compressing the intake air. Fresh air is diverted from the intake tract via a fresh air supply line. Depending on a switch position of a shut-off valve in the fresh air supply line, a flow of fresh air into a free volume of the crankcase is enabled or inhibited. The free volume of the crankcase is connected to the intake tract upstream of the compressor by means of the crankcase ventilation line. During the process of crankcase ventilation, the nitrogen oxide concentration in the crankcase ventilation line close to the point of introduction into the intake tract upstream of the compressor is detected by means of a nitrogen oxide sensor, and the tightness of the crankcase ventilation line is evaluated depending on the nitrogen oxide concentration detected.

The nitrogen oxide concentration in the crankcase ventilation line is dependent on whether the crankcase ventilation line has a leak of varying type or size, or has become detached or separated. By arranging the nitrogen oxide sensor at a location in or on the crankcase ventilation line close to its point of opening into the intake tract of the internal combustion engine, it is possible not only to establish the presence of a leak, but also to estimate where this leak occurs in the course of the crankcase ventilation line.

In some embodiments, a correctly functioning i.e. tight crankcase ventilation line is detected if the value of the nitrogen oxide concentration detected by the nitrogen oxide sensor exceeds a first predefined threshold value. This threshold value is determined by experiment on the test bench and stored in a memory of the control device of the internal combustion engine.

In some embodiments, the detected nitrogen oxide concentration is compared with a second threshold value which is lower than the first threshold value, and if this threshold value is not reached, a leak in the crankcase ventilation line is concluded. The amount of the second threshold value is established depending on the size of the leak to be detected. If legislators prescribe that a leak of a predefined size must be reliably detected, a corresponding threshold value is assigned to an internal combustion engine with a predefined crankcase device, taking into account the design of the internal combustion engine.

In some embodiments, the detected nitrogen oxide concentration is compared with a third threshold value which is lower than the second threshold value, and if this threshold value is not reached, it is concluded that the crankcase ventilation line has been removed or become detached. By staging the threshold values towards smaller values for the nitrogen oxide concentration, it is easily possible to distinguish a leak in the crankcase ventilation line from a fully detached, separated or absent crankcase ventilation line.

The FIGURE shows an internal combustion engine BKM comprising an intake tract 1, an engine block 2, a cylinder head 3 and an exhaust tract 4. In the flow direction of the intake air and starting from an intake opening 10, the intake tract 1 comprises successively an air filter 11, an air mass meter 12 as a load sensor, a compressor of an exhaust gas turbocharger, a charge air cooler 14, a throttle valve 15, an intake pipe 16 which leads to a cylinder Z1 via an intake duct in the engine block 2.

Further sensors in the intake tract 1 necessary for operation of the internal combustion engine BKM are not shown. The throttle valve 15 may comprise a throttle element (E gas) controlled by an electric motor, the opening cross-section of which can be adjusted, in addition to the actuation by the driver (driver request), via signals from an electronic control device 6 depending on the operating region of the internal combustion engine BKM. At the same time a signal is output to the control device 6 for monitoring and checking the position of the throttle valve 15.

The engine block 2 comprises a crankcase 20 which accommodates a crankshaft 21, and also a connecting rod 22 which is coupled to a piston 23 of the cylinder Z1 and couples the crankshaft 21 to the piston 23 of the cylinder Z1. The crankcase 20 is additionally filled partially with lubricant 24, in particular engine oil, which is circulated and filtered by means of devices which are not illustrated. Moreover, the crankcase 20 comprises a free volume which can extend, if appropriate, as far as the cylinder head 3.

The cylinder head 3 comprises a valve drive with a gas inlet valve 30 and a gas outlet valve 31 and associated valve drives 32, 33. The cylinder head 3 additionally comprises an injection valve 34 and a spark plug 35. In some embodiments, the injection valve 34 can also be arranged in the intake tract 1.

Viewed in the flow direction of the exhaust gas, the exhaust gas tract 4 comprises a turbine 41 of the exhaust gas turbocharger and an exhaust gas catalytic converter 42, formed for example as a 3-way catalyst. In some embodiments, further exhaust gas catalytic converters may be present. The turbine 41 is actively connected to the compressor 13 by means of a shaft (not designated in more detail) so that the exhaust gas stream flowing through the turbine 41 drives the compressor 13. Further sensors in the exhaust tract 4 necessary for operation of the internal combustion engine BKM are not shown.

To introduce blow-by gases present in the crankcase 20 into the intake tract 1, a crankcase ventilation device 5 is provided, also known as a PCV (positive crankcase ventilation system). The latter has a fresh air supply line 51 which branches off the intake tract 1 upstream of the air filter 11 and leads to the crankcase 20. A switchable shut-off valve 52 is arranged in the fresh air supply line 51 and is configured such that, depending on its switch position, the fresh air supply line 51 is coupled to the free volume of the crankcase 20 so that fresh air can flow into the crankcase 20, or is decoupled therefrom so that the fresh air supply into the crankcase 20 is inhibited. Alternatively, the fresh air supply line 51 may also branch off the intake tract 1 downstream of the air filter 14. This has the advantage that clean fresh air is used to flush the crankcase 20.

Furthermore, a crankcase ventilation line 53 is provided which connects the free volume of the crankcase 20 to the intake tract 1 at a point close to the inlet opening of the compressor 13. By means of the fresh air supply line 51 and the crankcase ventilation line 53, and by corresponding actuation of the changeover valve 52, the free volume of the crankcase 20 is ventilated under certain operating states of the internal combustion engine BKM. Since the blow-by gas to be discharged from the crankcase 20 usually carries with it lubricating oil in the form of oil mist, an oil separator is provided in the crankcase ventilation line 53, in some embodiments close to the point of connection of the crankcase ventilation line 53 to the crankcase 20. In this way, oil can be largely removed from the gas and the separated oil returned to the oil sump of the crankcase 20.

A regulating valve 55 in the form of an underpressure valve is arranged in the crankcase ventilation line 53 and automatically adapts an effective cross-section of the crankcase ventilation line 53 such that a defined underpressure relative to the ambient pressure is set in the crankcase 20. When there is a suitable low pressure in the intake tract 1 upstream of the compressor 13, to be precise in the region in which the second duct 53 opens into the intake tract 1, the gases located in the free volume of the crankcase 20 flow back into the intake tract 1 via the second duct 53. A pressure in the free volume of the crankcase 20 can be influenced by the respective switch position of the shut-off valve 52 in the fresh air supply line 51. In this way, by corresponding actuation of the shut-off valve 52, in its closed position for example, the flushing of the crankcase 20 is suppressed under certain operating conditions.

A nitrogen oxide sensor, referred to below as the $NO_x$ sensor 56, is arranged on the crankcase ventilation line 53 in the direct vicinity of its point of introduction into the intake tract 1 upstream of the compressor 13. Said sensor detects the nitrogen oxide content of the blow-by gas in the crankcase ventilation line 53. The signal from this $NO_x$ sensor 56 is used for diagnosis of the tightness of the crankcase ventilation line 53, as will be explained in more detail below.

Furthermore, a control device 6 is provided to which sensors are assigned which each detect different operating parameters assigned to the internal combustion engine BKM and generate a measurement signal representing the respective detected operating parameter. The sensors are for example the air mass meter 12 and the $NO_x$ sensor 56. Such $NO_x$ sensors are known in connection with monitoring exhaust gas catalysts of internal combustion engines and described for example in DE 10 2016 206 991 A1. Signals from further sensors necessary to control the internal combustion engine BKM and supplied to the control device 6 are generally designated with reference sign ES.

The control device 6 is configured to actuate control elements assigned to the internal combustion engine BKM, depending on at least one of the operating parameters, by means of corresponding actuator drives for which corresponding control inputs are produced for actuation thereof. The control device 6 may also be described as a device for operating the internal combustion engine, or engine control unit.

The control elements are for example the throttle valve 15, the injection valve 34, the spark plugs 35 and the shut-off valve 52. Further signals for further control elements which are necessary for the operation of the internal combustion engine BKM but not explicitly illustrated, are generally identified by the reference symbol AS. In some embodiments, the control device 6 comprises a calculation unit (processor) 61 which is coupled to a program memory 62, a data memory (value memory) 63 and a fault memory 64. The fault memory 64 is connected to a fault display apparatus 65. Various threshold values SW1 to SW4 for nitrogen oxide concentrations, the significance of which will be explained further below, are stored in the data memory 63.

Several programs for operating the internal combustion engine BKM are stored in the program memory and are processed during operation or also sometimes after shutdown. Amongst others, a map-based function FKT_DI-AL_KG for diagnosing the crankcase ventilation line 53 is implemented by means of software, as will be explained below.

During certain operating phases of the internal combustion engine BKM, in particular on cold start or at high load in charged operation, fuel which has entered the crankcase 20 and exhaust gases are supplied to the intake tract 1 via the crankcase ventilation line 53 in the case of active crankcase ventilation. These blow-by gases contain amongst others nitrogen oxides which are detected by means of the $NO_x$ sensor 56. If the crankcase ventilation line 53 is mounted correctly and fluid-tightly, and there is no leak in the crankcase ventilation line 53, the nitrogen oxide concentration detected by the $NO_x$ sensor 56 must lie above a predefined threshold value SW1, for example above 70 ppm. If there is a leak in the crankcase ventilation line 53, the nitrogen oxide concentration detected by the $NO_x$ sensor 56 will be lower. If this lies below a further predefined threshold value SW2, for example below 25 ppm, a leak in the crankcase ventilation line 53 is concluded.

If the connection of the crankcase ventilation line 53 to the intake tract 1 has been removed or become detached, the nitrogen oxide concentration detected by the $NO_x$ sensor 56 will be even lower than in the case of a leak in the crankcase ventilation line 53. If this lies below a third predefined threshold value SW3, for example below 5 ppm, it is concluded that the crankcase ventilation line 53 has become detached or has been removed. In both fault cases, an entry is made in the fault memory 64. Optionally, an optical and/or acoustic signal may be given to the vehicle driver by means of fault display apparatus 65.

In some embodiments, the threshold values SW1 to SW4 are predefined and stored in the data memory 63. In particular, the level of threshold value SW2 is established in accordance with the leak size to be detected as specified by legislation. By arranging the NOx sensor 56 in the crankcase ventilation line 53 in the immediate vicinity of its point of introduction into the intake tract 1 upstream of the compressor 13, not only can a general conclusion be drawn on the presence of a leak but also a rough estimate can be made of the location at which this leak occurs. The nitrogen oxide concentration detected by the $NO_x$ sensor 56 is lower, the closer the leak lies to the point of introduction of the crankcase ventilation line 53 into the intake tract 1.

In order to increase the accuracy of the measured nitrogen oxide concentration, the $NO_x$ sensor 56 is also diagnosed and adapted if required. This takes place in operating phases of the internal combustion engine BKM in which the pressure in the intake tract 1 downstream of the throttle valve 15 is lower than the ambient pressure. In this case, intake air flows through the crankcase ventilation line 53 into the crankcase 20 and then into the intake tract 1. The nitrogen oxide concentration measured by means of the $NO_x$ sensor 56 in this case should assume a value close to zero. If the detected nitrogen oxide concentration lies above a further threshold value SW4, for example 10 ppm, the $NO_x$ sensor 56 is classified as faulty. If however the measurement shows that the value of the nitrogen oxide concentration is different from zero but below the threshold value SW4, this value is used as an offset value for adaptation of the $NO_x$ sensor 56, so that the starting value of the $NO_x$ sensor 56 assumes a value close to zero ppm.

LIST OF REFERENCES

1 Intake tract
10 Intake opening
11 Air filter
12 Air mass meter
13 Compressor
14 Charge air cooler
15 Throttle valve
16 Intake pipe
2 Engine block
20 Crankcase
21 Crankshaft
22 Connecting rod
23 Piston
24 Lubricant
3 Cylinder head
30 Gas inlet valve
31 Gas outlet valve
32, 33 Valve drive
34 Injection valve
35 Spark plug
4 Exhaust tract
41 Turbine
42 Exhaust gas catalytic converter
5 Crankcase ventilation device
51 Fresh air supply line
52 Shut-off valve
53 Crankcase ventilation line
54 Oil separator
55 Control valve
56 $NO_x$ sensor
6 Electronic control device
61 Calculation unit, processor
62 Program memory
63 Data memory, value memory
64 Fault memory
65 Fault display apparatus
BKM Internal combustion engine
FKT_DIAL_KG Function for diagnosing the crankcase ventilation line
SW1-SW4 Threshold values for nitrogen oxide concentration
Z1 Cylinder

What is claimed is:

1. A method for diagnosing a crankcase ventilation line of a crankcase ventilation device for an internal combustion engine having a crankcase, an intake tract, and a compressor arranged in the intake tract for compressing the intake air, the method comprising:
   diverting fresh air from the intake tract via a fresh air supply line;
   either enabling or inhibiting a flow of fresh air into a free volume of the crankcase depending on a switch position of a shut-off valve in the fresh air supply line;
   wherein the crankcase ventilation line connects the free volume of the crankcase to the intake tract upstream of the compressor;
   detecting a nitrogen oxide concentration in the crankcase during the process of crankcase ventilation, close to the point of introduction into the intake tract upstream of the compressor using a nitrogen oxide sensor; and
   evaluating the tightness of the crankcase ventilation line based at least in part on the detected nitrogen oxide concentration.

2. The method as claimed in claim 1, further comprising comparing the detected nitrogen oxide concentration to a first predefined threshold value; and
   if the predefined threshold value is exceeded, identifying a tight crankcase ventilation line.

3. The method as claimed in claim 2, further comprising comparing the detected nitrogen oxide concentration to a second threshold value lower than the first threshold value; and
   if the second threshold value is not reached, identifying a leak in the crankcase ventilation line.

4. The method as claimed in claim 3, further comprising comparing the detected nitrogen oxide concentration to a third threshold value lower than the second threshold value; and
   if the third threshold value is not reached, identifying a removed or detached crankcase ventilation line.

5. The method as claimed in claim 3, wherein the predetermined threshold value depends on a size of a leak to be detected.

6. The method as claimed in claim 3, further comprising, if the first threshold value and the second threshold values are not reached:
   entering a corresponding fault entry in a fault memory of a control device; and/or
   activating a fault display apparatus for the driver of the vehicle powered by the internal combustion engine.

7. A device for diagnosing a crankcase ventilation line of a crankcase ventilation device for an internal combustion engine having a crankcase, an intake tract, and a compressor arranged in the intake tract for compressing the intake air, the device comprising:
   a fresh air supply line branching off the intake tract and connecting to the crankcase;
   a shut-off valve arranged in the fresh air supply line with a first switch position enabling a flow of fresh air into a free volume of the crankcase and a second switch position inhibiting the flow of fresh air into the free volume of the crankcase;

a crankcase ventilation line connecting the free volume of the crankcase to the intake tract upstream of the compressor;

a nitrogen oxide sensor arranged in the crankcase ventilation line at a location proximate the point of introduction into the intake tract upstream of the compressor, for detecting a nitrogen oxide concentration in the crankcase ventilation line; and a control device programmed to perform a method for diagnosing a crankcase ventilation line of a crankcase ventilation device for an internal combustion engine having a crankcase, an intake tract, and a compressor arranged in the intake tract for compressing the intake air, the method comprising:

diverting fresh air from the intake tract via a fresh air supply line;

either enabling or inhibiting a flow of fresh air into a free volume of the crankcase depending on a switch position of a shut-off valve in the fresh air supply line;

wherein the crankcase ventilation line connects the free volume of the crankcase to the intake tract upstream of the compressor;

detecting a nitrogen oxide concentration in the crankcase during the process of crankcase ventilation, close to the point of introduction into the intake tract upstream of the compressor using a nitrogen oxide sensor; and evaluating the tightness of the crankcase ventilation line based at least in part on the detected nitrogen oxide concentration.

* * * * *